(12) United States Patent
Xie et al.

(10) Patent No.: US 8,931,371 B2
(45) Date of Patent: Jan. 13, 2015

(54) HYBRID DRIVING SYSTEM AND VEHICLE HAVING THE SAME

(75) Inventors: Shibin Xie, Shenzhen (CN); Ou Ruan, Shenzhen (CN); Zhen Zhai, Shenzhen (CN); Ping Zhao, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 825 days.

(21) Appl. No.: 13/118,290

(22) Filed: May 27, 2011

(65) Prior Publication Data

US 2011/0290072 A1     Dec. 1, 2011

(30) Foreign Application Priority Data

May 31, 2010  (CN) .......................... 2010 1 0190297

(51) Int. Cl.
*F16H 37/06* (2006.01)
*B60K 6/547* (2007.10)
*B60K 6/48* (2007.10)
(Continued)

(52) U.S. Cl.
CPC . *B60K 6/547* (2013.01); *B60K 6/48* (2013.01); *B60K 2006/4808* (2013.01); *F16H 3/006* (2013.01); *F16H 2003/0931* (2013.01); *Y02T 10/6221* (2013.01); *Y02T 10/626* (2013.01); *Y10S 903/909* (2013.01)
USPC ........................................ 74/665 A; 903/909

(58) Field of Classification Search
CPC ............ F16H 2003/0931; F16H 3/006; B60K 2006/4808; B60K 6/48; B60K 6/547; Y02T 10/6221; Y02T 10/626
USPC .......... 74/661, 665 A, 665 L; 903/909; 475/5
See application file for complete search history.

(56) References Cited

U.S. PATENT DOCUMENTS 6,640,917 B2 * 11/2003  Maruyama ................... 180/65.6
6,645,105 B2 * 11/2003  Kima ............................... 475/5
7,249,537 B2 *  7/2007  Lee et al. ........................ 74/661
(Continued)

FOREIGN PATENT DOCUMENTS

| CN | 1637327   | 7/2005 |
| CN | 1637327 A | 7/2005 |
| CN | 1637327 C | 8/2007 |

OTHER PUBLICATIONS

European Patent Office, Extended European Search Report for Application No. EP 11167388.5, dated Aug. 16, 2011.
(Continued)

*Primary Examiner* — David M Fenstermacher
*Assistant Examiner* — Zakaria Elahmadi
(74) *Attorney, Agent, or Firm* — Squire Patton Boggs (US) LLP

(57) ABSTRACT

A hybrid power driving system includes an engine including a crankshaft; and a dual clutch transmission system coupled to the crankshaft. The dual clutch transmission system includes a first clutch, a second clutch, and a transmission. Both the first and second clutches are connected with the crankshaft. The transmission includes a first input shaft connected with the first clutch, a second input shaft connected with the second clutch, shifting gear sets, where each shifting gear set includes at least a stationary gear and a free gear; and an output shaft having one end coupled with a differential. The other end of the output shaft is connected with a driving electric motor. The driving electric motor drives the output shaft directly.

11 Claims, 2 Drawing Sheets

(51) Int. Cl.
*F16H 3/00* (2006.01)
*F16H 3/093* (2006.01)

(56) References Cited

U.S. PATENT DOCUMENTS

| | | | | |
|---|---|---|---|---|
| 2002/0033059 A1* | 3/2002 | Pels et al. | | 74/329 |
| 2002/0040818 A1* | 4/2002 | Maruyama | | 180/65.2 |
| 2002/0177504 A1* | 11/2002 | Pels et al. | | 477/3 |
| 2005/0101432 A1* | 5/2005 | Pels et al. | | 477/5 |
| 2005/0139035 A1* | 6/2005 | Lee et al. | | 74/661 |
| 2007/0028718 A1* | 2/2007 | Lee et al. | | 74/661 |
| 2007/0259748 A1* | 11/2007 | Forsyth | | 475/5 |
| 2008/0009379 A1* | 1/2008 | Steinwender | | 475/5 |
| 2008/0076616 A1* | 3/2008 | Kidokoro et al. | | 475/5 |
| 2011/0239819 A1* | 10/2011 | Shibahata | | 74/665 A |
| 2011/0269599 A1* | 11/2011 | Nakasako | | 477/5 |

OTHER PUBLICATIONS

State Intellectual Property Office, Examination Report for Application No. CN 201010190297.4, dated May 6, 2013.

* cited by examiner

HYBRID DRIVING SYSTEM AND VEHICLE HAVING THE SAME

CROSS-REFERENCE TO RELATED APPLICATIONS

The present application claims priority to Chinese Patent Application No. 201010190297.4, filed May 31, 2010, the entire disclosure of which is hereby incorporated by reference.

TECHNICAL FIELD

The present invention relates to a hybrid driving system and a hybrid vehicle comprising the hybrid driving system.

BACKGROUND

Presently, a hybrid vehicle usually adopts a power assembly that comprises two or more types of energy sources including an electric energy source such as a battery. The hybrid vehicle adopting an engine and a battery as the power system has become a research focus of the current vehicle power system due to it's low energy consumption and low emission performance.

Chinese application CN1637327 discloses a hybrid power driving system comprising a dual clutch transmission and a motor, in which the motor is directly coupled with the hollow input shaft of the transmission. In this case, the motor disposal may be complicated and the space may not be properly utilized. Moreover, the hollow input shaft may be broken while enduring a large torque.

SUMMARY

The present invention is directed to solving at least one problem existing in the prior art.

An embodiment in the present invention provides a hybrid driving system that may have a simpler motor arrangement. The hybrid driving system comprises: an engine including a crankshaft, and a dual clutch transmission system coupled to the crankshaft. The dual clutch transmission system includes: a first clutch, a second clutch connected with the crankshaft, and a transmission. The transmission includes a first input shaft connected with the first clutch; a second input shaft connected with the second clutch; a shifting gear set, each shifting gear set comprising at least a stationary gear and a free gear; at least one output shaft having one end coupled with a differential, and another end connected with a driving motor, the driving motor driving the at least one output shaft directly.

According to another embodiment of the present invention, the first input shaft is a hollow shaft and the second shaft is a solid shaft disposed in the first input shaft and shares the same axis thereof.

Preferably, the output shaft comprises one shaft only. The free gears of the shifting gear sets are disposed on the output shaft, and the stationary gears of the shifting gear set are disposed on the first input shaft and the second input shaft.

According to another embodiment of the present invention, from the engine side, disposed on the first input shaft are, in sequence, a reverse shift stationary gear, a second shift stationary gear, a fourth shift stationary gear and a sixth shift stationary gear. Disposed on the second input shaft are, in sequence, a seventh shift stationary gear, a fifth shift stationary gear, a third shift stationary gear, a first shift stationary gear. Disposed on the output shaft are free gears matching the respective stationary gears, driving gears coupled with the differential and driven gears coupled with the driving motors. The driven gears are engaged with the driving gears, and the driving gears are connected with the driving shaft of the driving electric motor. The driven gears are fixedly connected or integrated with the output shaft, The reverse shift stationary gear is engaged with the corresponding driving gear via an intermediate gear.

Advantageously, a first shift clutch is disposed between the first shift free gear and the third shift free gear to engage or disengage the first shift free gear and the third shift free gear with the output shaft; a second shift clutch is disposed between the fifth shift free gear and the seventh shift free gear to engage or disengage the fifth shift free gear and the seventh shift free gear with the output shaft; a third shift clutch is disposed between the fourth shift free gear and the sixth shift free gear to engage or disengage the fourth shift free gear and the sixth shift free gear with the output shaft; and a fourth shift clutch is disposed between the second shift free gear and the reverse shift free gear to engage or disengage the second shift free gear and the reverse shift free gear with the output shaft.

According to yet another embodiment of the present invention, the transmission comprises a first output shaft and a second output shaft, and the free gears of the shifting gears are disposed on the first output shaft and the second output shaft.

Optionally, starting from the engine side, disposed in sequence on the first input shaft are a second shift stationary gear, a fourth shift stationary gear and a sixth shift stationary gear; disposed in sequence on the second input shaft are a seventh shift stationary gear, a fifth shift stationary gear, a third shift stationary gear and a first shift stationary gear; disposed on the first output shaft are seven free gears corresponding to the above seven stationary gears and a first driving gear connected with the differential; disposed on the second output shaft a reverse shift free gear and a second driving gear connecting the differential. The second shift free gear is a stepped gear having an intermediate drive gear engaged with the reverse shift free gear.

Optionally, the driving electric motor may be coupled with the second output shaft. The driving shaft of the driving electric motor has a driving gear that is engaged with a driven gear that is disposed at one end of the second output shaft that is further from the differential. The driven gear is fixedly connected or integrated with the second output shaft.

Optionally, the driving electric motor may be coupled with the first output shaft. The driving shaft of the driving motor has a driving gear that is engaged with a driven gear that is disposed on one end of the first output shaft that is further from the differential. The driven gear is fixedly connected or integrated with the first output shaft.

According to yet another embodiment of the present invention, a first shift clutch is disposed between the first shift free gear and the third shift free gear to engage or disengage the first shift free gear and the third shift free gear with the first output shaft; a second shift clutch is disposed between the fifth shift free gear and the seventh shift free gear to engage or disengage the fifth shift free gear and the seventh shift free gear with the first output shaft; a third shift clutch is disposed between the second shift free gear and the fourth shift free gear to engage or disengage the second shift free gear and the fourth shift free gear with the first output shaft; a fourth shift clutch is disposed at the engine side of the sixth shift free gear to engage or disengage the sixth shift free gear with the first output shaft; and a fifth shift clutch is disposed at the transmission side of the reverse shift free gear to engage or disengage the reverse shift free gear with the second output shaft.

According to some other embodiments of the present invention, the transmission comprises a first output shaft, a second output shaft and a third output shaft. The free gears of the shifting gear sets are disposed on the first output shaft, the second output shaft and the third output shaft. The stationary gears of the shifting gear sets are disposed on the first input shaft and the second input shaft.

Preferably, starting from the engine side, disposed in sequence on the first input shaft are a second shift stationary gear, a fourth shift stationary gear; disposed in sequence on the second input shaft are a seventh shift stationary gear, a third shift stationary gear, a fifth shift stationary gear and a first shift stationary gear, wherein the sixth shift and the fourth shift shares one stationary gear; disposed on the first output shaft are a first driving gear connected to the differential and four free gears corresponding to the second shift stationary gear, the fourth shift stationary gear, the third shift stationary gear and the first shift stationary gear; disposed in sequence on the second output shaft a second driving gear connected to the differential, an intermediate stepped free gear connected to the second shift stationary gear and three free gears corresponding to the sixth shift stationary gear, the seventh shift stationary gear and the fifth shift stationary gear; disposed on the third output shaft are a reverse shift free gear and a third driving gear connected to the differential. The intermediate stepped free gear has a larger gear wheel engaging the second shift stationary gear and a smaller gear wheel engaging the reverse shift free gear.

Optionally, the driving motor may be coupled with the third output shaft. The driving shaft of the driving motor has a fourth driving gear that is engaged with a driven great that is disposed on one end of the third output shaft that is further away from the differential. The driven gear is fixedly connected or integrated with the third output shaft.

Advantageously, the third output shaft has a parking ratchet wheel.

Optionally, the driving motor may be coupled with the second output shaft. The driving shaft of the driving motor has a fourth driving gear that is engaged with a driven gear that is disposed on one end of the second driving shaft that is further away from the differential. The driven gear is fixedly connected or integrated with the second output shaft.

Optionally, the driving motor may be coupled with the first output shaft. The driving shaft of the driving motor has a fourth driving gear that is engaged with a driven gear that is disposed on one end of the first driving shaft that is further away from the differential. The driven gear is fixedly connected or integrated with the first output shaft.

Preferably, a first shift clutch is disposed between the first shift free gear and the third shift free gear to engage or disengage the first shift free gear and the third shift free gear with the first output shaft; a second shift clutch is disposed between the fifth shift free gear and the seventh shift free gear to engage or disengage the fifth shift free gear and the seventh shift free gear with the first output shaft; a third shift clutch is disposed between the second shift free gear and the fourth shift free gear to engage or disengage the second shift free gear and the fourth shift free gear with the first output shaft; a fourth shift clutch is disposed between the sixth shift free gear and the intermediate stepped free gear to engage or disengage the sixth shift free gear and the intermediate stepped free gear with the second output shaft; and a fifth shift clutch is disposed at the transmission side of the reverse shift free gear to engage or disengage the reverse shift free gear with the second output shaft.

It can be understood that, compared with the existing method of arranging the motor on the hollow input shaft, as the driving motor is arranged on the output shaft in the hybrid driving system according to the embodiments of the present invention, the motor arrangement is simpler and the space is better utilized. And it is easy for the disposal of other components of the vehicle in the front cabin. The problem of breaking the hollow input shaft when it is subjected to a large torque may be avoided. Moreover, when setting the driving motor on the same output shaft with the reverse shift free gear, a pure electric reversing mode which cannot be realized in the prior art may be achieved. Furthermore, by adopting dual clutch transmission system in the hybrid vehicle, the characteristics of the dual clutch transmission system may be fully utilized and further enhance the vehicle's dynamical performance and fuel economy.

The present invention further provided a vehicle comprising the above mentioned hybrid driving systems. Preferably the hybrid driving system is disposed in the front cabin of the vehicle.

DESCRIPTION OF THE DRAWINGS

These and other aspects and advantages of the disclosure will become apparent and more readily appreciated from the following descriptions taken in conjunction with the drawings in which.

DETAILED EMBODIMENTS OF THE PRESENT INVENTION

Reference will be made in detail to embodiments of the present disclosure. The embodiments described herein with reference to drawings are explanatory, illustrative, and used to generally understand the present disclosure. The embodiments shall not be construed to limit the present disclosure.

Figure 1:
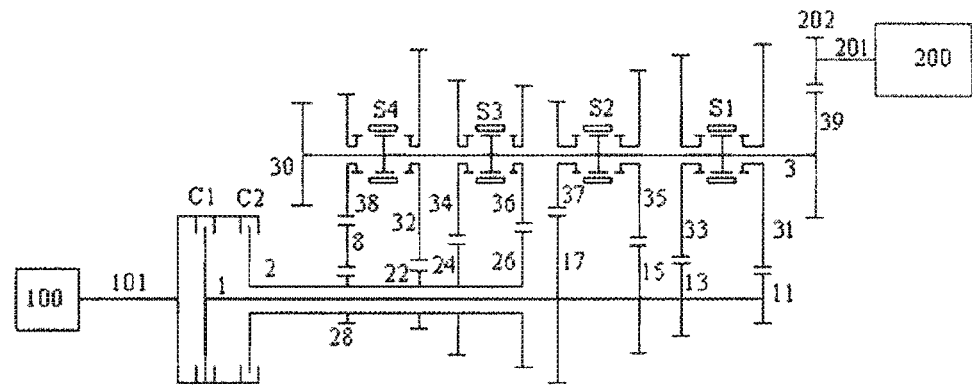
FIG. 1 shows a first embodiment of the hybrid driving system according to the present invention.
Figure 2:
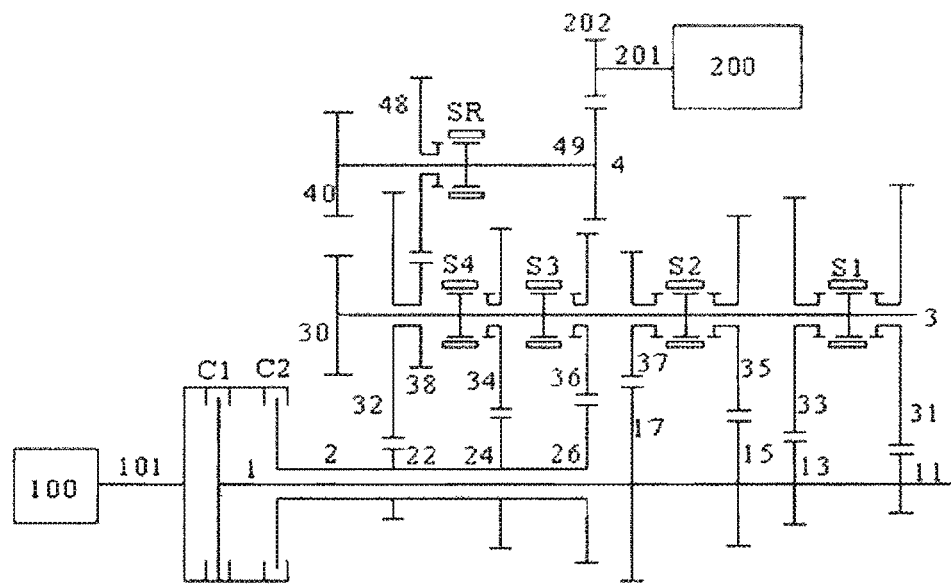
FIG. 2 shows a second embodiment of the hybrid driving system according to the present invention.
Figure 3:
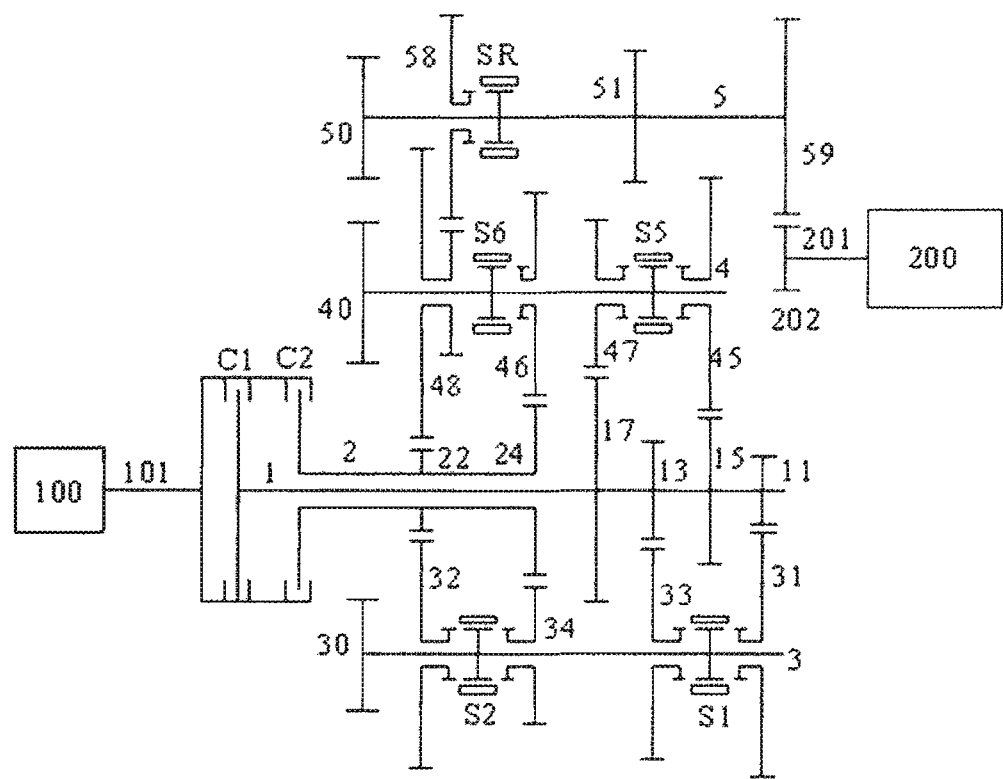
FIG. 3 shows a third embodiment of the hybrid driving system according to the present invention.

As shown in FIG. 1 through FIG. 3, a hybrid driving system according to an embodiment of the present invention comprises an engine 100 having a crankshaft 101 and a dual clutch transmission system, which comprises a first clutch C1, a second clutch C2 and a transmission. The first clutch C1 and the second clutch C2 are effectively connected with the crankshaft 101 of the engine. The transmission has a first input shaft 2 effectively connected with the first clutch C2, a second input shaft 1 effectively connected with the second clutch C1, a transmission shifting gear set and at least one output shaft. Each of the transmission shifting gear sets comprises at least a stationary gear and a free gear. The free gear engages or disengages with the corresponding input shaft or output shaft via a corresponding shift clutch to change the speed ratio between the input shaft and the at least one output shaft. The at least one output shaft is coupled with the differential The transmission may have at least one output shaft having one end that is further away from the differential is connected with a driving electric motor 200. The driving electric motor 200 may directly drive the output shaft that is connected to the driving electric motor 200. Preferably, the first input shaft 2 is hollow, and the second input shaft 1 is set inside the first input shaft 2 and shares the same axis.

The following are examples which further describe the details of the present invention.

Example 1

As shown in FIG. 1, an embodiment of the present invention has a first input shaft 2, a second input shaft 1, one output shaft 3, and shifting gear sets. The free gear of each shifting gear set is disposed on the output shaft 3, and the stationary gear of each shifting gear set is disposed on the first input shaft 2 and the second input shaft 1. Specifically, starting from the engine side, a reverse shift stationary gear 28, a second shift stationary gear 22, a fourth shift stationary gear 24 and a sixth shift stationary gear 26 are disposed in sequence on the first input shaft 2. And a seventh stationary gear 17, a fifth stationary gear 15, a third stationary gear 13 and a first stationary gear 11 are disposed in sequence on the second input shaft 1. And the free gears (31, 32, 33, 34, 35, 36, 37, 38) of the shifting gear sets responding to the respective stationary gears (11, 22, 13, 24, 15, 26, 17, 28) as well as a driven gear 39 connecting the driving motor 200 are disposed in sequence on the output shaft 3. And the driven gear 39 is engaged with a driving gear 202 that is connected with the driving shaft 201 of the driving electric motor 200. The driven gear 39 is fixedly connected or integrated with the output shaft 3. The reverse shift stationary gear 28 engages the corresponding free gear 38 via an intermediate gear 8, and the intermediate gear 8 mainly changes the direction of rotation to realize the reversing mode of the vehicle.

In the present embodiment, a first shift clutch S1 is disposed between the first shift free gear 31 and the third shift free gear 33 to engage or disengage the first shift free gear 31 and the third shift free gear 33 with the output shaft 3. A second shift clutch S2 is disposed between the fifth shift free gear 35 and the seventh shift free gear 37 to engage or disengage the fifth shift free gear 35 and the seventh shift free gear 37 with the output shaft 3. A third shift clutch S3 is disposed between the fourth shift free gear 34 and the sixth shift free gear 36 to engage or disengage the fourth shift free gear 34 and the sixth shift free gear 36 with the output shaft 3. A fourth shift clutch S4 is disposed between the second shift free gear 32 and the reverse shift free gear 38 to engage or disengage the second shift free gear 32 and the reverse shift free gear 38 with the output shaft 3.

In the present embodiment, the driving electric motor is disposed on the same output shaft with the reverse shift free gear. Therefore it may realize a pure electrical reverse mode (in this case, the clutch C1 and C2 are not engaged).

Example 2

As shown in FIG. 2, another embodiment of the present invention has a first input shaft 2, a second input shaft 1, a first output shaft 3, a second output shaft 4 and shifting gear sets. The free gears of the shifting gear sets are disposed on the first output shaft 3 or the second output shaft 4, and the stationary gears of the shifting gear sets are disposed on the first input shaft 2 and the second input shaft 1. Specifically, starting from the engine side, a second shift stationary gear 22, a fourth shift stationary gear 24 and a sixth shift stationary gear 26 are disposed in sequence on the first input shaft 2. And a seventh stationary gear 17, a fifth stationary gear 15, a third stationary gear 13 and a first stationary gear 11 are disposed in sequence on the second input shaft 1. The free gears (31, 32, 33, 34, 35, 36, 37) corresponding to the stationary gears (11, 22, 13, 24, 15, 26, 17) and a first driving gear 30 are disposed on the first output shaft 3. And a reverse shift free gear 48, a second driving gear 40 connected to the differential are disposed on the second output shaft 4. The second shift free gear 22 is a stepped gear having a smaller intermediate driving gear 38, where the intermediate driving gear 38 is engaged with the reverse shift free gear 48.

In the present embodiment, the driving motor 200 is disposed on the second output shaft 4, wherein the driving shaft 201 of the driving motor has a driving gear 202. A driven gear 49 engaging the driving gear 202 is disposed on one end of the second output shaft 4 that is further away from the differential is disposed with. The driven gear 49 is fixedly connected or integrated with the second output shaft 4.

As an alternation to this second embodiment, the driving motor 200 may be disposed on the first output shaft 3. Specifically, the driving shaft of the driving electric motor may be connected to a driving gear, and one end of the first output shaft 3 that is further away from the differential has a driven gear that is engaged with the driving gear. The driven gear is fixedly connected or integrated with the first output shaft 3.

In the present embodiment, a first shift clutch S1 may be disposed between the first shift free gear 31 and the third shift free gear 33 to engage or disengage the first shift free gear 31 and the third shift free gear 33 with the first output shaft 3. A second shift clutch S2 may be disposed between the fifth shift free gear 35 and the seventh shift free gear 37 to engage or disengage the fifth shift free gear 35 and the seventh shift free gear 37 with the first output shaft 3. A third shift clutch S4 may be disposed between the second shift free gear 32 and the fourth shift free gear 34 to engage or disengage the second shift free gear 32 and the fourth shift free gear 34 with the first output shaft 3. A fourth shift clutch S3 may be disposed at the engine side of the sixth shift free gear 36 to engage or disengage the sixth shift free gear 36 with the first output shaft 3. A fifth shift clutch SR may be disposed at the transmission side of the reverse shift free gear 48 to engage or disengage the reverse shift free gear 48 with the second output shaft 4.

In the present embodiment, since the driving motor 200 is disposed on the same output shaft as the reverse shift free gear, i.e., the second output shaft, a pure electrical reverse mode may also be realized.

Example 3

The embodiment shown in FIG. 3, has a first input shaft 2, a second input shaft 1, a first output shaft 3, a second output shaft 4, a third output shaft 5, and shifting gear sets. The free gears of the shifting gear sets are disposed on the first output shaft 3, the second output shaft 4 and the third output shaft 5. The stationary gears of the shifting gear sets are disposed on the first input shaft 2 and the second input shaft 1. Specifically, starting from the engine side, a second shift stationary gear 22 and a fourth shift stationary gear 24 are disposed in sequence on the first input shaft 2. And a seventh stationary gear 17, a fifth stationary gear 15, a third stationary gear 13 and a first stationary gear 11 are disposed on the second input shaft 1. The sixth shift and the fourth shift share one stationary gear 24. A first driving gear 30 connected to the differential and four free gears 32, 34, 33, 31 respectively matching the second shift stationary gear 22, the fourth shift stationary gear 24, the third shift stationary gear 13 and the first shift stationary gear 11 are disposed on the first output shaft 3. A second driving gear 40 connected to the differential, an intermediate stepped free gear 48 connected to the second shift stationary gear 22 and three free gears 46, 47, 45 respectively matching the sixth shift stationary gear 24, the seventh shift stationary gear 17 and the fifth shift stationary gear 15 are disposed on the second output shaft 4. A reverse shift free gear 58 and a third driving gear 50 connected to the differential are disposed on the third output shaft 5. The intermediate stepped free gear 48 has a larger gear wheel engaging the second shift stationary gear 22 and a smaller gear wheel engaging the reverse shift free gear 58. Preferably, a parking ratchet gear 51 is also disposed on the third output shaft 5. As a limited number of gears are arranged on the third output shaft 5, sufficient space is available to accommodate the parking ratchet gear 51 to avoid inappropriate space utilization when the parking ratchet gear 51 is placed at another place.

In the present embodiment, the driving electric motor 200 may be coupled with the third output shaft 5. The driving shaft 201 of the driving electric motor 200 is coupled to the third output shaft 5 via a driving gear 202 and a driven gear 59. The driving gear 202 is disposed on the driving shaft 201 of the driving electric motor 200, and the driven gear 59 is disposed to one end of the third output shaft 5 that is further away from the differential. The driven gear 59 is fixedly connected or integrated with the third output shaft 5.

As an alternative to this third embodiment, the driving electric motor 200 may be connected to the second output shaft 4. Specifically, the driving shaft of the driving electric motor has a driving gear that is engaged with a driven gear that is disposed on one end of the second output shaft 4 that is further away from the differential. The driven gear is fixedly connected or integrated with the second output shaft 4.

As an alternative to this third embodiment, the driving electric motor 200 may be connected to the first output shaft 3. Specifically, the driving shaft of the driving electric motor may have a driving gear that is engaged with a driven gear that is disposed on one end of the first output shaft that is further away from the differential. The driven gear and the first output shaft are fixedly connected or integrated.

In the present embodiment, a first shift clutch S1 is disposed between the first shift free gear 31 and the third shift free gear 33 to engage or disengage the first shift free gear 31 and the third shift free gear 33 with the first output shaft 3. And a second shift clutch S2 is disposed between the second shift free gear 32 and the fourth shift free gear 34 to engage or disengage the second shift free gear 32 and the fourth shift free gear 34 with the first output shaft 3. And a third shift clutch S5 is disposed between the fifth shift free gear 45 and the seventh shift free gear 47 to engage or disengage the fifth shift free gear 45 and the seventh shift free gear 47 with the second output shaft 4. And a fourth shift clutch S6 is disposed between the sixth shift free gear 46 and the intermediate free gear 48 to engage or disengage the sixth shift free gear 46 and the intermediate free gear 48 with the second output shaft 4. And a fifth shift clutch SR is disposed at the transmission side of the reverse shift free gear 58 to engage or disengage the reverse shift free gear 58 with the third output shaft 5.

In the present embodiment, while the driving electric motor 200 is disposed on the same output shaft (i.e., the third output shaft) as the reverse shift free gear, a pure electrical reversing mode may also be realized.

In the hybrid driving systems according to the above embodiments, the driving electric motor is disposed on the output shaft. Compared to the present method of arranging the driving electric motor on the hollow shaft, the motor disposal in the present invention may be simpler and the utilization of the space may be more desirable. And, breaking of the hollow input shaft while subject to a large torque may be avoided. Moreover, while the driving electric motor is disposed on the same shaft with the reverse shift gear, a pure electric reversing mode which cannot be realized in the prior art may be obtained.

In the existing method of arranging the driving electric motor on the hollow shaft, under the hybrid driving mode (the driving motor and the engine both drive), two shift clutches are needed during shifting (one for the output of the engine, the other one for the output of the driving motor) if the current shift is not on the hollow shaft. Therefore it's difficult to control the shift. According to some embodiments of the present invention, the driving motor is directly connected to the driving gear, the driving gear is always engaged with the driven gear, and the driven gear is fixedly connected or integrated with the corresponding output shaft. Therefore, the power output of the driving motor does not need to go through a shift clutch. Accordingly, one shift clutch is needed to control the engine power in this case and the control may be easier.

A hybrid driving system according to the present invention efficiently utilizes the space and therefore is easy for the arrangement of the other components in the vehicle.

Moreover, by adopting a dual clutch transmission system in the hybrid vehicle, the characteristics of the dual clutch transmission system may be utilized and further enhance the vehicle's fuel economy and dynamic performance.

The present invention further provides a vehicle having the above mentioned hybrid driving system. Preferably the hybrid driving system is disposed in the front cabin of the vehicle.

Although explanatory embodiments have been shown and described, it would be appreciated by those skilled in the art that changes, alternatives, and modifications can be made in the embodiments without departing from spirit and principles of the disclosure. Such changes, alternatives, and modifications all fall into the scope of the claims and their equivalents.

What is claimed is:

1. A hybrid power driving system comprising:
   an engine including a crankshaft; and
   a dual clutch transmission system coupled to the crankshaft;
   wherein the dual clutch transmission system includes,
      a first clutch,
      a second clutch, wherein both the first and second clutches are connected with the crankshaft, and
      a transmission including,
         a first input shaft connected with the first clutch,
         a second input shaft connected with the second clutch,
         shifting gear sets, each shifting gear set including at least a stationary gear and a free gear;
         an output shaft having one end coupled with a differential, and the other end of the output shaft being connected with a driving electric motor, the driving electric motor driving the output shaft directly;
         wherein the output shaft includes a first output shaft, a second output shaft and a third output shaft, wherein the free gear of each shifting gear set is disposed on the first output shaft, the second output shaft or the third output shaft, and wherein the stationary gear of each shifting gear set is disposed on the first input shaft or the second input shaft; and
         wherein, starting from the engine side, a second shift stationary gear and a fourth shift stationary gear are disposed in sequence on the first input shaft; a seventh shift stationary gear, a third shift stationary gear, a fifth shift stationary gear and a first shift stationary gear are disposed in sequence on the second input shaft, the sixth shift and the fourth shift sharing one stationary gear; a first driving gear connected to the differential and four free gears corresponding to the second shift stationary gear, the fourth shift stationary gear, the third shift stationary gear and the first shift stationary gear are disposed on the first output shaft; a second driving gear connected to the differential, an intermediate stepped free gear connected to the second shift stationary gear and three free gears corresponding to the sixth shift stationary gear, the seventh shift stationary gear and the fifth shift stationary gear are disposed on the second output shaft; a reverse shift free gear and a third driving gear connected to the differential are disposed on the third output shaft; wherein the intermediate stepped free gear has a larger gear wheel engaging the second shift stationary gear and a smaller gear wheel engaging the reverse shift free gear.

2. The hybrid driving system according to claim 1, wherein the first input shaft is hollow, and wherein the second input shaft is inserted into the first input shaft and shares the same axle as the first input shaft.

3. The hybrid driving system according to claim 1, wherein the driving electric motor is coupled with the third output shaft, wherein the driving shaft of the driving motor has a fourth driving gear that is engaged with a first driven gear that is disposed at one end of the third output shaft that is further away from the differential, and wherein the first driven gear is fixedly connected or integrated with the third output shaft.

4. The hybrid driving system according to claim 3, wherein the third output shaft has a parking ratchet wheel.

5. The hybrid driving system according to claim 1, wherein the driving electric motor is coupled with the second output shaft, wherein the driving shaft of the driving motor has a fourth driving gear that is engaged with a first driven gear that is disposed one end of the second driving shaft that is further away from the differential, and wherein the first driven gear is fixedly connected or integrated with the second output shaft.

6. The hybrid driving system according to claim 1, wherein the driving electric motor is coupled with the first output shaft, wherein the driving shaft of the driving motor has a fourth driving gear that is engaged with a first driven gear that is disposed one end of the first driving shaft that is further away from the differential, and wherein the first driven gear is fixedly connected or integrated with the first output shaft.

7. The hybrid driving system according to claim 6, wherein a first shift clutch is disposed between the first shift free gear and the third shift free gear to engage or disengage the first shift free gear and the third shift free gear with the first output shaft; a second shift clutch is disposed between the fifth shift free gear and the seventh shift free gear to engage or disengage the fifth shift free gear and the seventh shift free gear with the first output shaft; a third shift clutch is disposed between the second shift free gear and the fourth shift free gear to engage or disengage the second shift free gear and the fourth shift free gear with the first output shaft; a fourth shift clutch is disposed between the sixth shift free gear and the intermediate stepped free gear to engage or disengage the sixth shift free gear and the intermediate stepped free gear with the second output shaft; and a fifth shift clutch is disposed at the transmission side of the reverse shift free gear to engage or disengage the reverse shift free gear with the second output shaft.

8. The hybrid driving system according to claim 1, wherein a first shift clutch is disposed between the first shift free gear and the third shift free gear to engage or disengage the first shift free gear and the third shift free gear with the first output shaft; a second shift clutch is disposed between the fifth shift free gear and the seventh shift free gear to engage or disengage the fifth shift free gear and the seventh shift free gear with the first output shaft; a third shift clutch is disposed between the second shift free gear and the fourth shift free gear to engage or disengage the second shift free gear and the fourth shift free gear with the first output shaft; a fourth shift clutch is disposed between the sixth shift free gear and the intermediate stepped free gear to engage or disengage the sixth shift free gear and the intermediate stepped free gear with the second output shaft; and a fifth shift clutch is disposed at the transmission side of the reverse shift free gear to engage or disengage the reverse shift free gear with the second output shaft.

9. A vehicle comprising the hybrid driving system according to claim 1.

10. The vehicle according to claim 9, wherein the hybrid driving system is disposed in a front cabin of the vehicle.

11. A hybrid power driving system comprising:
an engine including a crankshaft; and
a dual clutch transmission system coupled to the crankshaft;
wherein the dual clutch transmission system includes,
a first clutch,
a second clutch, wherein both the first and second clutches are connected with the crankshaft, and
a transmission including,
a first input shaft connected with the first clutch,
a second input shaft connected with the second clutch,
shifting gear sets, each shifting gear set including at least a stationary gear and a free gear;
an output shaft having one end coupled with a differential, and the other end of the output shaft being connected with a driving electric motor, the driving electric motor driving the output shaft directly;
wherein the first input shaft is hollow, and wherein the second input shaft is inserted into the first input shaft and shares the same axle as the first input shaft;
wherein the output shaft includes a first output shaft, a second output shaft and a third output shaft, wherein the free gear of each shifting gear set is disposed on the first output shaft, the second output shaft or the third output shaft, and wherein the stationary gear of each shifting gear set is disposed on the first input shaft or the second input shaft; and
wherein, starting from the engine side, a second shift stationary gear and a fourth shift stationary gear are disposed in sequence on the first input shaft; a seventh shift stationary gear, a third shift stationary gear, a fifth shift stationary gear and a first shift stationary gear are disposed in sequence on the second input shaft, the sixth shift and the fourth shift sharing one stationary gear; a first driving gear connected to the differential and four free gears corresponding to the second shift stationary gear, the fourth shift stationary gear, the third shift stationary gear and the first shift stationary gear are disposed on the first output shaft; a second driving gear connected to the differential, an intermediate stepped free gear connected to the second shift stationary gear and three free gears corresponding to the sixth shift stationary gear, the seventh shift stationary gear and the fifth shift stationary gear are disposed on the second output shaft; a reverse shift free gear and a third driving gear connected to the differential are disposed on the third output shaft; wherein the intermediate stepped free gear has a larger gear wheel engaging the second shift stationary gear and a smaller gear wheel engaging the reverse shift free gear.

* * * * *